(12) United States Patent
Anderson et al.

(10) Patent No.: US 10,955,543 B2
(45) Date of Patent: Mar. 23, 2021

(54) STATION DETECTION USING FREQUENCY-DIVERSE ARRAY SIGNALS

(71) Applicant: Intel Corporation, Santa Clara, CA (US)

(72) Inventors: Glen J. Anderson, Beaverton, OR (US); Tae Young Yang, Portland, OR (US); Jason A. Mix, Portland, OR (US); Chieh-Yih Wan, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/721,962

(22) Filed: Dec. 20, 2019

(65) Prior Publication Data

US 2020/0142051 A1     May 7, 2020

(51) Int. Cl.
*H04B 7/12* (2006.01)
*G01S 13/76* (2006.01)
*H04B 17/27* (2015.01)
*H04W 64/00* (2009.01)

(52) U.S. Cl.
CPC .............. *G01S 13/762* (2013.01); *H04B 7/12* (2013.01); *H04B 17/27* (2015.01); *H04W 64/006* (2013.01)

(58) Field of Classification Search
CPC ....... H04W 64/00; H04B 17/27; G01S 13/762
See application file for complete search history.

(56) References Cited

U.S. PATENT DOCUMENTS

2019/0265353 A1* 8/2019 Jones ................... G01S 15/8995
2020/0166601 A1* 5/2020 Chen ...................... H04W 64/00

OTHER PUBLICATIONS

Pi et al., "Large-Scale Sharply Bending Paraxial Beams", APL Photonics, published on May 1, 2019, 7 pages, APL Photonics 4, 056101 (2019).
Schley et al., "Loss-Proof Self-Accelerating Beams and Their Use in Non-Paraxial Manipulation of Particles' Trajectories", Nature Communications, published on Oct. 30, 2014, 7 pages, Macmillan Publishers Limited.
Liu et al., "Survey of Wireless Indoor Positioning Techniques and Systems", IEEE Transaction on Systems, Man, and Cybernetics—Part C: Applications and Reviews, Nov. 6, 2007, pp. 1067-1080, IEEE, vol. 37, No. 6.

(Continued)

*Primary Examiner* — Michael T Vu
(74) *Attorney, Agent, or Firm* — Viering, Jentschura & Partner MBB

(57) ABSTRACT

A positioning device and positioning method in which a first wireless signal is transmitted along a first signal path having a first signal path angle that changes relative to time; second wireless signal data representing a response of a wireless station to the first wireless signal is received; a third wireless signal is transmitted along a second signal path; and an assumption that an obstruction is between the wireless communication device and the wireless station is generated if the wireless communication device receives a response from the wireless station to the first wireless signal but does not receive a response from the wireless station to the third wireless signal; wherein the second signal path is a linear path.

26 Claims, 15 Drawing Sheets

(56) References Cited

OTHER PUBLICATIONS

Ren et al., "On the Design of Time-Domain Implemention Structure for Steerable Spherical Modal Beamformers With Arbitrary Beampatterns", Applied Acoustics, published on Mar. 7, 2017, 6 pages, Elsevier Ltd.
So et al., "Introduction to the Issue on Time/Frequency Modulated Array Signal Processing", IEEE Journal of Selected Topics in Signal Processing,, Mar. 2017, pp. 225-227, IEEE, vol. 11, No. 2.
Wang et al., "Beamforming of Frequency Diverse Array Radar With Nonlinear Frequency Offset Based on Logistic Map", Progress in Electromagnetics Research M, Jan. 27, 2018, pp. 55-63, vol. 64.
Wang, "Overview of Frequency Diverse Array in Radar and Navigation Applications", IET Radar, Sonar & Navigation, Oct. 25, 2015, pp. 1001-1012, ISSN 1751-8784, The Institution of Engineering and Technology, vol. 10, Iss. 6.

\* cited by examiner

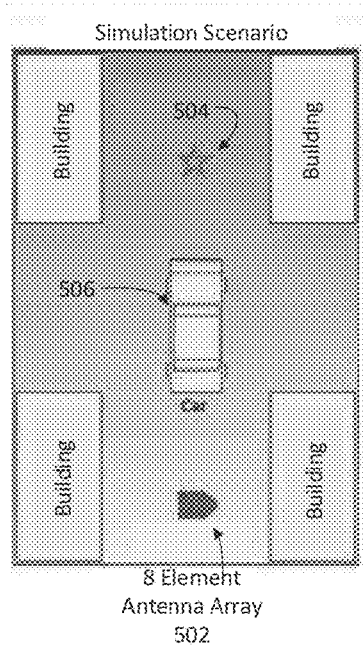 FIG. 5A Simulation Scenario
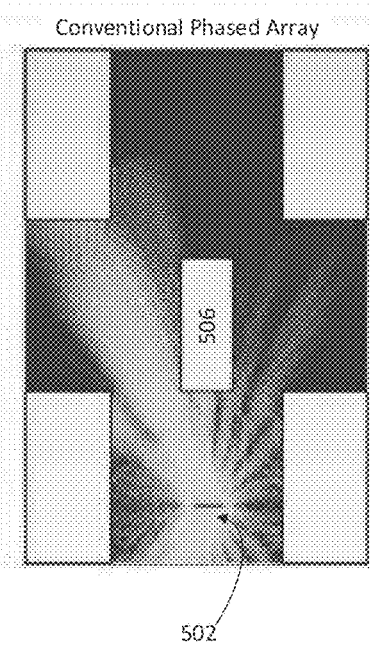 FIG. 5B Conventional Phased Array
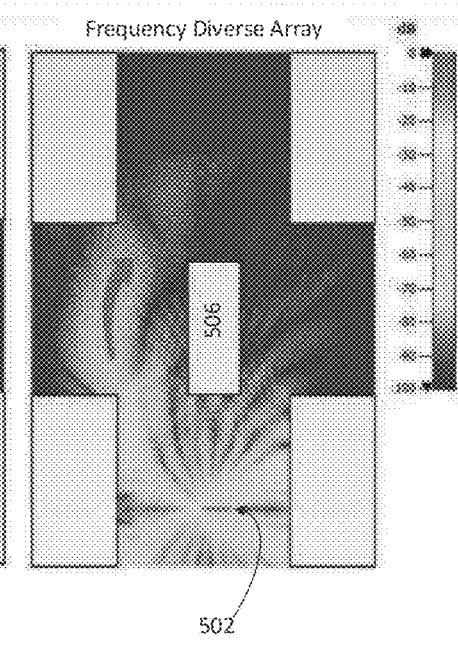 FIG. 5C Frequency Diverse Array

FIG. 10

| Target / Features | f1 (LOS signal 1) | f2 (non-LOS signal 1) | f3 (non-LOS signal 2) | ... | Ground truth (label) |
|---|---|---|---|---|---|
| t1 | f11 | f12 | f13 | ... | High risk (target blocked, very close) |
| t2 | f21 | f22 | f23 | ... | High risk (target blocked, very close) |
| t3 | f31 | f32 | f33 | ... | Medium risk (target blocked, far) |
| ... | ... | ... | ... | ... | ... |

FIG. 12

Transmitting a first wireless signal along a first signal path having a first signal path angle that changes relative to time 1202

Receiving second wireless signal data representing a response of a wireless station to the first wireless signal 1204

Determining a first position of the wireless station based at least on the first signal path and the second wireless signal data 1206

FIG. 13

Transmitting a first wireless signal along a first signal path having a first signal path angle that changes relative to time 1302

Receiving second wireless signal data representing a response of a wireless station to the first wireless signal 1304

Transmitting a third wireless signal along a second signal path 1306

Generating an assumption that an obstruction is between the wireless communication device and the wireless station if the wireless communication device receives a response from the wireless station to the first wireless signal but does not receive a response from the wireless station to the third wireless signal 1308

FIG. 14

Transmitting a first wireless signal along a first signal path having a first signal path angle that changes relative to time 1402

Receiving second wireless signal data representing a response of a wireless station to the first wireless signal 1404

Transmitting a third wireless signal along a second signal path 1406

Generating an assumption that a line of sight is present between the wireless communication device and the wireless station if the wireless communication device receives a response from the wireless station to both the first wireless signal and the third wireless signal 1408

STATION DETECTION USING FREQUENCY-DIVERSE ARRAY SIGNALS

TECHNICAL FIELD

Various aspects of this disclosure generally relate to frequency-diverse array ("FDA") signals for positioning and/or mapping.

BACKGROUND

As fifth generation cellular network technology ("5G") becomes a reality, many new uses of 5G have been proposed in the context of vehicle-to-vehicle, vehicle-to-infrastructure, and vehicle-to-pedestrian ("V2X") communications. Because 5G may rely on mmWave signals for communication, the various characteristics and behaviors of mmWaves are of particular importance. One characteristic of mmWaves is that they allow line-of-sight ("LOS") communication at very high rates (i.e., <2 ms for 2-way exchange) and high-density. These vary high communication rates may be of particular use in peer-to-peer communication tasks such as lane changing (in combination with cameras and LiDAR).

Another emerging technology is frequency-diverse array (FDA) technology. Although FDA technology will be described in greater detail herein, FDA may generally be understood as the sending and receiving radio signals along a curved path. An emitter can prorogate a signal along a predictable curve, and the receiving device can respond along a similar curve.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIGS. 5A, 5B, and 5C depict the use of a conventional phased array and an FDA to reach a non-LOS target;

FIG. 10 depicts a table for the conversion of raw data into a labeled dataset;

FIG. 12 depicts a positioning method according to a first aspect of the disclosure;

FIG. 13 depicts a positioning method according to a second aspect of the disclosure; and FIG. 14 depicts a positioning method according to a third aspect of the disclosure.

DESCRIPTION

Figure 1:
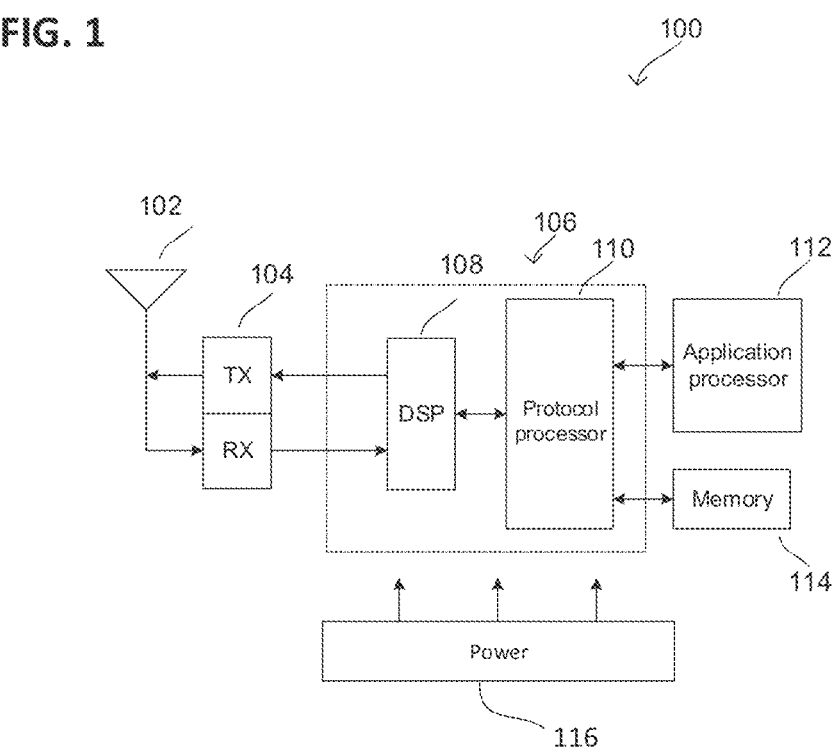
FIG. 1 depicts an exemplary internal configuration of wireless communication device.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

Any vector and/or matrix notation utilized herein is exemplary in nature and is employed solely for purposes of explanation. Accordingly, aspects of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

As used herein, "memory" is understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component comprising one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "wireless communication device" utilized herein refers to user-side devices (both portable and fixed) that can connect to a core network and/or external data networks via a radio access network. "Wireless communication device" can include any mobile or immobile wireless communication device, including User Equipment ("UEs"), Mobile Stations ("MSs"), Stations ("STAs"), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases wireless communication devices can also include application-layer components, such as application processors or other general processing components, that are directed to functionality other than wireless communications. Wireless communication devices can optionally support wired communications in addition to wireless communications. Furthermore, wireless communication devices can include vehicular communication devices that function as wireless communication devices.

The term "network access node" as utilized herein refers to a network-side device that provides a radio access network with which wireless communication devices can connect and exchange information with a core network and/or external data networks through the network access node. "Network access nodes" can include any type of base station or access point, including macro base stations, micro base stations, NodeBs, evolved NodeBs ("eNBs"), Home base stations, Remote Radio Heads ("RRHs"), relay points, Wi-Fi/WLAN Access Points ("APs"), Bluetooth master devices, DSRC RSUs, wireless communication devices acting as network access nodes, and any other electronic device capable of network-side wireless communications, including both immobile and mobile devices (e.g., vehicular network access nodes, mobile cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels. Furthermore, the term "cell" may be utilized to refer to any of a macrocell, microcell, femtocell, picocell, etc. Certain communication devices can act as both wireless communication devices and network access nodes, such as a wireless communication device that provides network connectivity for other wireless communication devices.

The term "vehicular communication device" refers to any type of mobile machine or device or system that can communicate with other communication devices or systems. Vehicular communication devices may include dedicated communication components (for example in the manner of a wireless communication device, network access node, and/or relay node), that are configured to communicate with other communication devices such as wireless communication devices, network access nodes, and other vehicular communication devices. Vehicular communication devices can be terrestrial vehicles (e.g., automobiles, cars, trains, motorcycles, bicycles, utility vehicles, terrestrial drones or robots, or other land-based vehicles), aerospace vehicles (e.g., airplanes, helicopters, aerial drones, rockets, spacecraft, satellites, or other aeronautic or astronautic vehicles), and/or aquatic or sub-aquatic vehicles (e.g., boats, submarines, or other water/fluid-based vehicles). Vehicular communication devices may or may not transport passengers or cargo.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. Various exemplary radio communication technologies that the aspects described herein may utilize include, but are not limited to: a Global System for Mobile Communications ("GSM") radio communication technology, a General Packet Radio Service ("GPRS") radio communication technology, an Enhanced Data Rates for GSM Evolution ("EDGE") radio communication technology, and/or a Third Generation Partnership Project ("3GPP") radio communication technology, for example Universal Mobile Telecommunications System ("UMTS"), Freedom of Multimedia Access ("FOMA"), 3GPP Long Term Evolution ("LTE"), 3GPP Long Term Evolution Advanced ("LTE Advanced"), Code division multiple access 2000 ("CDMA2000"), Cellular Digital Packet Data ("CDPD"), Mobitex, Third Generation (3G), Circuit Switched Data ("CSD"), High-Speed Circuit-Switched Data ("HSCSD"), Universal Mobile Telecommunications System ("Third Generation") ("UMTS (3G)"), Wideband Code Division Multiple Access (Universal Mobile Telecommunications System) ("W-CDMA (UMTS)"), High Speed Packet Access ("HSPA"), High-Speed Downlink Packet Access ("HSDPA"), High-Speed Uplink Packet Access ("HSUPA"), High Speed Packet Access Plus ("HSPA+"), Universal Mobile Telecommunications System-Time-Division Duplex ("UMTS-TDD"), Time Division-Code Division Multiple Access ("TD-CDMA"), Time Division-Synchronous Code Division Multiple Access ("TD-CDMA"), 3rd Generation Partnership Project Release 8 (Pre-4th Generation) ("3GPP Rel. 8 (Pre-4G)"), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access ("LAA"), MuLTEfire, UMTS Terrestrial Radio Access ("UTRA"), Evolved UMTS Terrestrial Radio Access ("E-UTRA"), Long Term Evolution Advanced (4th Generation) ("LTE Advanced (4G)"), cdmaOne ("2G"), Code division multiple access 2000 (Third generation) ("CDMA2000 (3G)"), Evolution-Data Optimized or Evolution-Data Only ("EV-DO"), Advanced Mobile Phone System (1st Generation) ("AMPS (1G)"), Total Access Communication arrangement/Extended Total Access Communication arrangement ("TACS/ETACS"), Digital AMPS (2nd Generation) ("D-AMPS (2G)"), Push-to-talk ("PTT"), Mobile Telephone System ("MTS"), Improved Mobile Telephone System ("IMTS"), Advanced Mobile Telephone System ("AMTS"), OLT (Norwegian for Offentlig Landmobil Telefoni, Public Land Mobile Telephony), MTD (Swedish abbreviation for Mobiltelefonisystem D, or Mobile telephony system D), Public Automated Land Mobile ("Autotel/PALM"), ARP (Finnish for Autoradiopuhelin, "car radio phone"), NMT (Nordic Mobile Telephony), High capacity version of NTT (Nippon Telegraph and Telephone) ("Hicap"), Cellular Digital Packet Data ("CDPD"), Mobitex, DataTAC, Integrated Digital Enhanced Network ("iDEN"), Personal Digital Cellular ("PDC"), Circuit Switched Data ("CSD"), Personal Handy-phone System ("PHS"), Wideband Integrated Digital Enhanced Network ("WiDEN"), iBurst, Unlicensed Mobile Access ("UMA"), also referred to as also referred to as 3GPP Generic Access Network, or GAN standard), Zigbee, Bluetooth®, Wireless Gigabit Alliance ("WiGig") standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle ("V2V") and Vehicle-to-X ("V2X") and Vehicle-to-Infrastructure ("V2I") and Infrastructure-to-Vehicle ("I2V") communication technologies, 3GPP cellular V2X, DSRC (Dedicated Short Range Communications) communication arrangements such as Intelligent-Transport-Systems, and other existing, developing, or future radio communication technologies. As used herein, a first radio communication technology may be different from a second radio communication technology if the first and second radio communication technologies are based on different communication standards.

Aspects described herein may use such radio communication technologies according to various spectrum management schemes, including, but not limited to, dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies), and may be use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, aspects described herein can also employ radio communication technologies on a secondary basis on bands such as the TV White Space bands (typically below 790 MHz) where e.g. the 400 MHz and 700 MHz bands are prospective candidates. Besides cellular applications, specific applications for vertical markets may be addressed such as PMSE (Program Making and Special Events), medical, health, surgery, automotive, low-latency, drones, etc. applications. Furthermore, aspects described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. Aspects described herein can also use radio communication technologies with different Single Carrier or OFDM flavors (CP-OFDM, SC-FDMA, SC-OFDM, filter bank-based multicarrier (FBMC), OFDMA, etc.) and e.g. 3GPP NR (New Radio), which can include allocating the OFDM carrier data bit vectors to the corresponding symbol resources.

For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications ("GSM"), Code Division Multiple Access 2000 ("CDMA2000"), Universal Mobile Telecommunications System ("UMTS"), Long Term Evolution ("LTE"), General Packet Radio Service ("GPRS"), Evolution-Data Optimized ("EV-DO"), Enhanced Data Rates for GSM Evolution ("EDGE"), High Speed Packet Access (HSPA; including High Speed Downlink Packet Access ("HSDPA"), High Speed Uplink Packet Access ("HSUPA"), HSDPA Plus ("HSDPA+"), and HSUPA Plus ("HSUPA+")), Worldwide Interoperability for Microwave Access ("WiMax") (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

The terms "radio communication network" and "wireless network" as utilized herein encompasses both an access section of a network (e.g., a radio access network ("RAN") section) and a core section of a network (e.g., a core network section). The term "radio idle mode" or "radio idle state" used herein in reference to a wireless communication device refers to a radio control state in which the wireless communication device is not allocated at least one dedicated communication channel of a mobile communication network. The term "radio connected mode" or "radio connected state" used in reference to a wireless communication device refers to a radio control state in which the wireless communication device is allocated at least one dedicated uplink communication channel of a radio communication network.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations. The term "channel state information" is used herein to refer generally to the wireless channel for a wireless transmission between one or more transmitting antennas and one or more receiving antennas and may take into account any factors that affect a wireless transmission such as, but not limited to, path loss, interference, and/or blockage.

FIG. 1 shows an exemplary internal configuration of wireless communication device 100 (an exemplary communication device) according to some aspects, which may include antenna system 102, RF transceiver 104, baseband modem 106 (including digital signal processor 108 and controller 110), application processor 112, memory 114, and power supply 116. Although not explicitly shown in FIG. 1, in some aspects wireless communication device 100 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Wireless communication device 100 may transmit and receive radio signals on one or more radio access networks and/or directly with one or more other wireless communication devices (e.g., vehicle-to-vehicle communication). Baseband modem 106 may direct such communication functionality of wireless communication device 100 according to the communication protocols associated with each radio access network, and may execute control over antenna system 102 and RF transceiver 104 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of wireless communication device 100 shown in FIG. 1 depicts only a single instance of such components.

Wireless communication device 100 may transmit and receive wireless signals with antenna system 102, which may be a single antenna or an antenna array that includes multiple antennas. In some aspects, antenna system 102 may additionally include analog antenna combination and/or beamforming circuitry. In the receive ("RX") path, RF transceiver 104 may receive analog radio frequency signals from antenna system 102 and perform analog and digital RF front-end processing on the analog radio frequency signals to produce baseband samples (e.g., In-Phase/Quadrature ("IQ") samples) to provide to baseband modem 106. RF transceiver 104 may include analog and digital reception components including amplifiers (e.g., Low Noise Amplifiers ("LNAs")), filters, RF demodulators (e.g., RF IQ demodulators)), and analog-to-digital converters ("ADCs"), which RF transceiver 104 may utilize to convert the received radio frequency signals to baseband samples. In the transmit ("TX") path, RF transceiver 104 may receive baseband samples from baseband modem 106 and perform analog and digital RF front-end processing on the baseband samples to produce analog radio frequency signals to provide to antenna system 102 for wireless transmission. RF transceiver 104 may thus include analog and digital transmission components including amplifiers (e.g., Power Amplifiers ("PAs"), filters, RF modulators (e.g., RF IQ modulators), and digital-to-analog converters ("DACs"), which RF transceiver 104 may utilize to mix the baseband samples received from baseband modem 106 and produce the analog radio frequency signals for wireless transmission by antenna system 102. In some aspects baseband modem 106 may control the radio transmission and reception of RF transceiver 104, including specifying the transmit and receive radio frequencies for operation of RF transceiver 104.

As shown in FIG. 1, baseband modem 106 may include digital signal processor 108, which may perform physical layer (PHY, Layer 1) transmission and reception processing to, in the transmit path, prepare outgoing transmit data provided by controller 110 for transmission via RF transceiver 104, and, in the receive path, prepare incoming received data provided by RF transceiver 104 for processing by controller 110. Digital signal processor 108 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 108 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 108 may include one or more processors configured to retrieve and execute program code that algorithmically defines control and processing logic for physical layer processing operations. In some aspects, digital signal processor 108 may execute processing functions with software via the execution of executable instructions. In some aspects, digital signal processor 108 may include one or more dedicated hardware circuits (e.g., ASICs, FPGAs, and other hardware) that are digitally configured to specific execute processing functions. The one or more processors of digital signal processor 108 may offload certain processing tasks to these dedicated hardware circuits, which are referred to herein as hardware accelerators. Exemplary hardware accelerators can include Fast Fourier Transform ("FFT") circuits and encoder/decoder circuits. In some aspects, the processor and hardware accelerator components of digital signal processor 108 may be realized as a coupled integrated circuit.

Wireless communication device 100 may be configured to operate according to one or more radio communication technologies. Digital signal processor 108 may implement lower-layer (e.g., Layer 1/PHY) processing functions of the radio communication technologies, while controller 110 may implement upper-layer protocol stack functions (e.g., Data Link Layer/Layer 2 and Network Layer/Layer 3). Controller 110 may thus implement controlling the radio communication components of wireless communication device 100 (antenna system 102, RF transceiver 104, and digital signal processor 108) in accordance with the communication protocols of each supported radio communication technology, and accordingly may represent the Access Stratum and Non-Access Stratum ("NAS") (also encompassing Layer 2 and Layer 3) of each supported radio communication technology. Controller 110 may be structurally embodied as a protocol processor configured to execute protocol software (retrieved from a controller memory) and subsequently control the radio communication components of wireless communication device 100 to transmit and receive communication signals in accordance with the corresponding protocol control logic defined in the protocol software. Controller 110 may include one or more processors configured to retrieve and execute program code that algorithmically defines the upper-layer protocol stack logic for one or more radio communication technologies, which can include Data Link Layer/Layer 2 and Network Layer/Layer 3 functions. Controller 110 may be configured to perform both user-plane and control-plane functions to facilitate the transfer of application layer data to and from wireless communication device 100 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by controller 110 may include executable instructions that algorithmically defines these functions.

In some aspects, wireless communication device 100 may be configured to transmit and receive data according to multiple radio communication technologies. Accordingly, in some aspects, one or more of antenna system 102, RF transceiver 104, digital signal processor 108, and controller 110 may include separate components or instances dedicated to different radio communication technologies and/or unified components that are shared between different radio communication technologies. For example, in some aspects controller 110 may be configured to execute multiple protocol stacks, each dedicated to a different radio communication technology and either at the same processor or different processors. In some aspects, digital signal processor 108 may include separate processors and/or hardware accelerators that are dedicated to different respective radio communication technologies, and/or one or more processors and/or hardware accelerators that are shared between multiple radio communication technologies. In some aspects, RF transceiver 104 may include separate RF circuitry sections dedicated to different respective radio communication technologies, and/or RF circuitry sections shared between multiple radio communication technologies. In some aspects, antenna system 102 may include separate antennas dedicated to different respective radio communication technologies, and/or antennas shared between multiple radio communication technologies. Accordingly, while antenna system 102, RF transceiver 104, digital signal processor 108, and controller 110 are shown as individual components in FIG. 1, in some aspects antenna system 102, RF transceiver 104, digital signal processor 108, and/or controller 110 can encompass separate components dedicated to different radio communication technologies.

Wireless communication device 100 may also include application processor 112, memory 114, and power supply 116. Application processor 112 may be a CPU, and may be configured to handle the layers above the protocol stack, including the transport and application layers. Application processor 112 may be configured to execute various applications and/or programs of wireless communication device 100 at an application layer of wireless communication device 100, such as an operating system ("OS"), a user interface ("UI") for supporting user interaction with wireless communication device 100, and/or various user applications. The application processor may interface with baseband modem 106 and act as a source (in the transmit path) and a sink (in the receive path) for user data, such as voice data, audio/video/image data, messaging data, application data, basic Internet/web access data, etc. In the transmit path, controller 110 may therefore receive and process outgoing data provided by application processor 112 according to the layer-specific functions of the protocol stack, and provide the resulting data to digital signal processor 108. Digital signal processor 108 may then perform physical layer processing on the received data to produce baseband samples, which digital signal processor may provide to RF transceiver 104. RF transceiver 104 may then process the baseband samples to convert the baseband samples to analog radio signals, which RF transceiver 104 may wirelessly transmit via antenna system 102. In the receive path, RF transceiver 104 may receive analog radio signals from antenna system 102 and process the analog radio signals to obtain baseband samples. RF transceiver 104 may provide the baseband samples to digital signal processor 108, which may perform physical layer processing on the baseband samples. Digital signal processor 108 may then provide the resulting data to controller 110, which may process the resulting data according to the layer-specific functions of the protocol stack and provide the resulting incoming data to application processor 112. Application processor 112 may then handle the incoming data at the application layer, which can include execution of one or more application programs with the data and/or presentation of the data to a user via a user interface. Although shown separately in FIG. 1, in some aspects controller 110 and application processor 112 may be implemented as one or more processors that execute program code defining both protocol stack and application layer functions. The depiction of FIG. 1 thus shows the functional separation between the protocol stack and application layer without limiting implementations to being separate or unified.

Memory 114 may embody a memory component of wireless communication device 100, such as a hard drive or another such permanent memory device. Although not explicitly depicted in FIG. 1, the various other components of wireless communication device 100 shown in FIG. 1 may additionally each include integrated permanent and non-permanent memory components, such as for storing software program code, buffering data, and other storage uses.

Power supply 116 may be an electrical power source that provides power to the various electrical components of wireless communication device 100. Depending on the design of wireless communication device 100, power supply 116 may be a 'definite' power source such as a battery (e.g., rechargeable or disposable) or an 'indefinite' power source such as a wired electrical connection. Operation of the various components of wireless communication device 100 may thus pull electrical power from power supply 116.

In accordance with some radio communication networks, wireless communication devices 102 and 104 may execute mobility procedures to connect to, disconnect from, and switch between available network access nodes of the radio access network of radio communication network 100. As each network access node of radio communication network 100 may have a specific coverage area (one or more of which can be overlapping or mutually exclusive), wireless communication devices 102 and 104 may be configured to select and re-select between the available network access nodes to maintain a suitable radio access connection with the radio access network of radio communication network 100. For example, wireless communication device 100 may establish a radio access connection with network access node 110 while wireless communication device 104 may establish a radio access connection with network access node 114. In the event that the current radio access connection degrades, wireless communication devices 104 or 106 may seek a new radio access connection with another network access node of radio communication network 100. For example, wireless communication device 104 may move from the coverage area of network access node 114 into the coverage area of network access node 110. As a result, the radio access connection with network access node 114 may degrade, which wireless communication device 104 may detect via radio measurements such as signal strength or signal quality measurements of network access node 114. Depending on the mobility procedures defined in the appropriate network protocols for radio communication network 100, wireless communication device 104 may seek a new radio access connection (which may be, for example, triggered at wireless communication device 104 or by the radio access network), such as by performing radio measurements on neighboring network access nodes to determine whether any neighboring network access nodes can provide a suitable radio access connection. As wireless communication device 104 may have moved into the coverage area of network access node 110, wireless communication device 104 may identify network access node 110 (which may be selected by wireless communication device 104 or selected by the radio access network) and transfer to a new radio access connection with network access node 110. Such mobility procedures, including radio measurements, cell selection/reselection, and handover, are established in the various network protocols and may be employed by wireless communication devices and the radio access network to maintain suitable radio access connections between each wireless communication device and the radio access network across any number of different radio access network scenarios.

Various aspects of this disclosure may rely on frequency-diverse array (FDA) technology for generation and transmission of wireless signals (e.g. transmission beams) whose direction changes relative to time. For completeness, a brief overview of FDA technology will thus be provided. Throughout this disclosure, signals may be described as FDA signals or linear signals, non-LOS signals or LOS signals. As will be described herein, and from a technical standpoint, linear LOS-signals are a subset of FDA signals. Nevertheless, the terms FDA signals and non-LOS signals will generally be used herein to describe signals which travel along a path whose angle changes relative to time. Similarly, the terms LOS-signals and linear signals will generally be used herein to describe signals that travel along a linear path whose angle does not change relative to time.

Figure 2A:
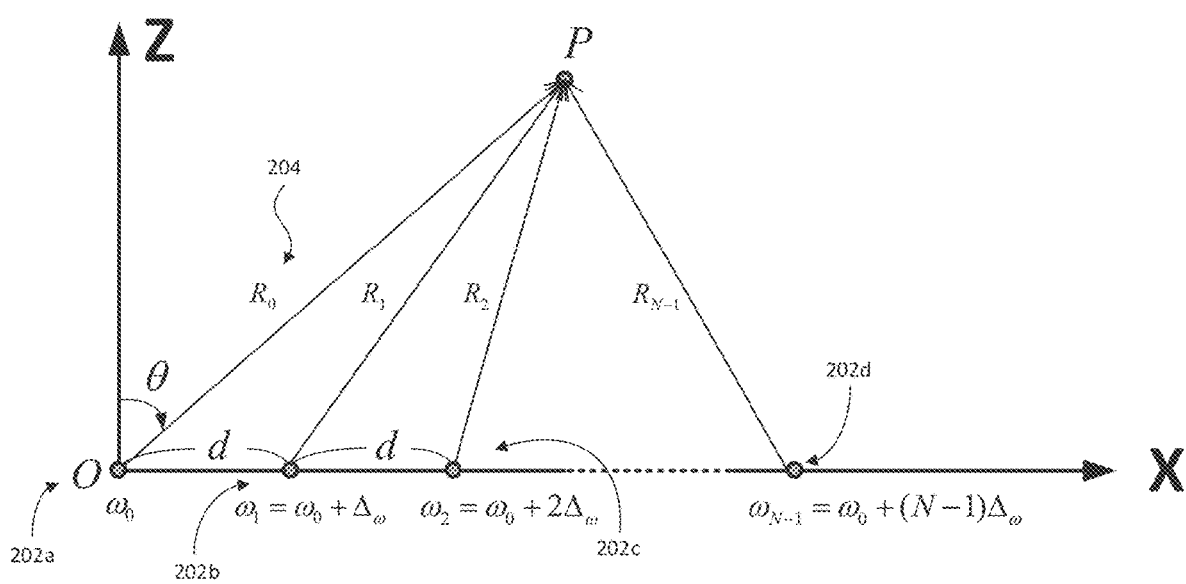
FIGS. 2A and 2B depict a plurality of antenna elements for transmission of an FDA signal.
Figure 2B:
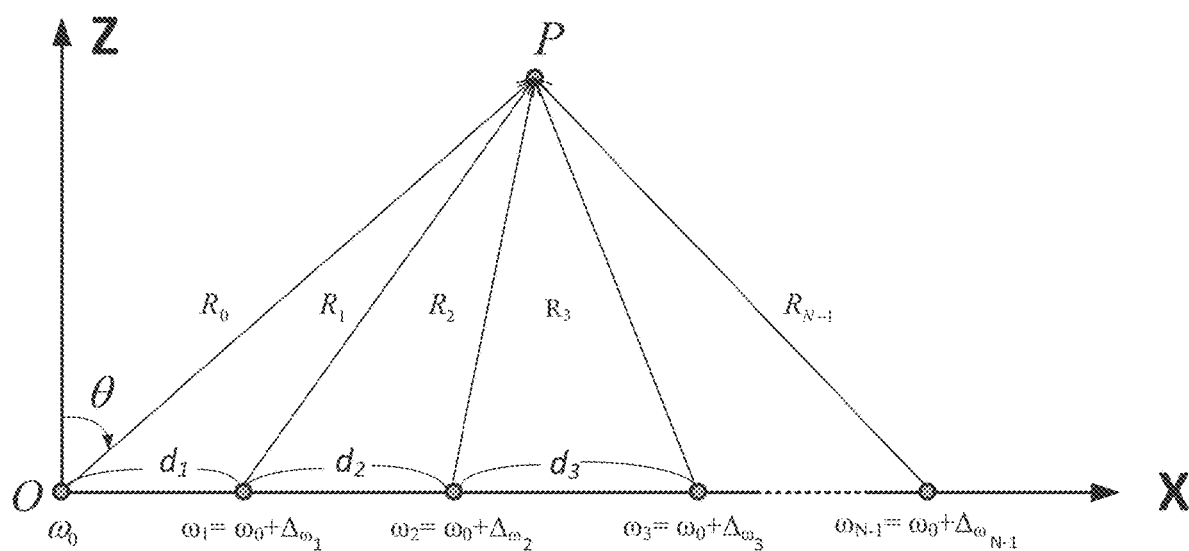

FIGS. 2A and 2B depict a plurality of antenna elements for transmission of an FDA signal. This FDA may include a plurality of elements antennas 202a, 202b, 202c, and 202d, as depicted along the x-axis. Each element antenna may be physically separated by distance d from any adjacent antenna. The reference angular frequency of the signals injecting into the antenna may be $\omega_0$; $\Delta_\omega$ may be the difference between angular frequencies of the signals injecting into the antenna; R 204 may be the distance between each antenna and observation point (P); and N may be the total number of element antennas in the FDA. In general, it is not necessary for the distance d and the angular frequency difference $\Delta_\omega$ to be uniform between element antennas. These could be assigned with different values to design a curved path.

Because the antenna is a passive linear system in general, any linear combination of offset angular frequency distributions can be injected to the antenna system. This can generate multiple simultaneous non-LOS curves out of the same antenna system.

The time-domain antenna array factor ("AF") can be written with far-field approximations such that the AF represents the time-, range-, and angular-dependent FDA radiation pattern as follows, assuming uniform distance d and angular frequency offset $\Delta_\omega$ as an illustrative example.

$$[AF](t, R, \theta) = \sum_{n=0}^{N-1} [e^{j\omega_n t}]\left[e^{-j\frac{\omega_n}{c_0}R_n}\right] \approx e^{j\omega_0\left(t-\frac{R_0}{c_0}\right)} e^{j\frac{\gamma}{2}(N-1)} \frac{\sin\left(\frac{\gamma}{2}N\right)}{\sin\left(\frac{\gamma}{2}\right)} \quad (1)$$

where $c_0$ is the speed of light. In contrast to the AF as described herein, the radiation pattern of conventional phased array antennas is only angular-dependent.

The energy-radiation phase constant ($\gamma$) can be written with further approximations as:

$$\gamma \approx \frac{\omega_0}{c_0}d\sin\theta + \boxed{\Delta_\omega\left(t-\frac{R_0}{c_0}\right)} \quad (2)$$

The first term in the above phase constant equation may be identical to that of a conventional phased array antenna, which provides an angular-dependent energy radiation pattern. The terms in the dotted box (formula 2, above) are unique to FDA, which explains the time- and range-dependent radiation pattern. Accordingly, FDA can be operated as a conventional phased array if the offset angular frequency ($\Delta_\omega$) is set to be zero. Thus, the conventional phased array may be understood as a subset of FDA architecture. If distance d and angular frequency offset $\Delta_\omega$ are varying, i.e. $d_1, d_2, \ldots, d_{N-1}$ and $\Delta_{\omega 1}, \Delta_{\omega 2}, \ldots, \Delta_{\omega N-1}$ over element antennas, FDA signals are simultaneously injected to the same antenna array to create a specific curved beam and/or multiple curved beams.

The locus of radiated energy maximum locations can be estimated for a given time (t) and range (R, distance between FDA and observation point). The analytic, estimated curve for uniform distance d and angular frequency offset $\Delta_\omega$ may be found as $$\begin{bmatrix} x_{|AF|Max} \\ z_{|AF|Max} \end{bmatrix} = \begin{bmatrix} R_0\sin(\theta_{|AF|Max}) \\ R_0\cos(\theta_{|AF|Max}) \end{bmatrix} \quad (3)$$

where $$\theta_{|AF|Max}(t, R_0) = \sin^{-1}\left(\frac{\Delta_\omega(R_0 - c_0 t)}{\omega_0 d}\right) \quad (4)$$

The derived maximum locus curve can be useful to determine location of vehicles by geometry and signal timing. It can also be used as an analytic filtering function when it is implemented in a rule-based or machine-learning-leveraged detection algorithm.

Although non-LOS communication may be possible in certain implementations, non-LOS communication has generally relied on signal reflection to reach the intended recipient. In practical applications, such signal reflection may be difficult or impossible to predict, and communication strategies that rely on signal reflection may be prone to error or communication failure. This problem may be magnified as shorter wavelength signals are adopted.

As described above, FDA technology permits non-LOS communication by sending signals along a path, whose angular direction changes relative to time. Otherwise stated, FDA communication permits transfer of signals along a curved path. Such curved paths may be selected to transmit signals around obstructions and thus to create predictable and selectable non-LOS communication. That is, if locations of obstructions are known, or even if the locations of obstructions can generally be estimated, FDA parameters may be selected to transmit FDA beams "around" the obstructions. Similarly, and as will be described in greater detail, if communication can be established (i.e., such as with a ping) with a vehicle or other device using FDA but not using LOS, then it can be assumed that an obstruction is located along the LOS signal path.

According to an aspect of the disclosure, this non-LOS communication may be combined with LOS communication to map or otherwise obtain additional information about an object's surroundings. That is, the ability to send both LOS and curved (non-LOS or FDA) signals may allow for mapping of objects that are outside of LOS constraints (e.g., mapping of non-LOS entities) by comparing replies from the receiving devices to both LOS and non-LOS signals. For example, if a device replies to a non-LOS signal and not to an LOS signal, this strongly suggests that the replying device is in a vicinity of the sender, but that the replying device is not visible (e.g., such as by camera or LIDAR) to the sender. This juxtaposition of information can be used to detect and/or map communicating vehicles relative to obstructions. This may be of particular relevance in places of heavy traffic or where automobiles must navigate around one another but may not otherwise be visible to one another. For example, this may be of particular relevance in parking lots. Furthermore, unlike known methods of image sensing and/or image mapping (e.g., via image sensors such as cameras, LIDAR, etc.), both LOS and non-LOS communication as described herein are robust to factors that impact image sensor communication (e.g., rain, snow, dust, etc.).

According to an aspect of the disclosure, a device or system that is configured to perform both LOS and non-LOS communication can compare both the LOS and non-LOS (i.e., curved) signals to map the locations of objects that are non-LOS. This may be achieved, for example, by comparing replies from the receiving devices to LOS and non-LOS signals. This may be performed with moving vehicles, stationary vehicles, or combinations of moving and stationary vehicles. This may also be performed with any kind of vehicle without limitation, including, but not limited to ground transportation vehicles (automobiles, trucks, motorcycles, and the like), unmanned aerial vehicles, manned aerial vehicles, or otherwise. According to an aspect of the disclosure, and for any given vehicle using LOS and non-LOS signals as described herein, the navigation system of the vehicle may be configured to compare and/or interpret the results of the radio comparisons to determine a navigation plan for the vehicle. That is, the locations of vehicle and obstructions may be better mapped, such that navigation plans may be constructed to help avoid accidents and delays.

Figure 3A:
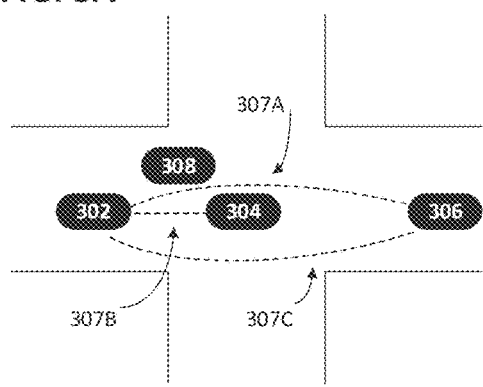
FIGS. 3A and 3B depict mapping from a combination of LOS and non-LOS communication.
Figure 3B:
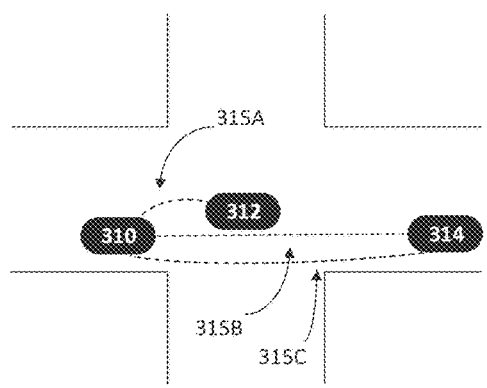

FIGS. 3A and 3B depict a simplified example, in which LOS and non-LOS communication are used to map one or more vehicles that may not be directly visible to the mapping vehicle. In FIG. 3A, vehicles 302, 304, 306 and 308 are depicted. Although these may represent any type of vehicle, it may be assumed for the purposes of demonstration of the underlying concepts that vehicle 304 is a large vehicle of significant height (i.e., cargo truck, delivery van, or the like). Vehicle 302 may seek to establish communication with vehicle 306 and may accordingly send three signals: signal A 307A, signal B 307B, and signal C 307B. Signal B 307B in this example is a LOS signal. In contrast, and as can be seen in the figure, signals A 307A and C 307C are non-LOS signals (e.g. FDA signals or curved signals). In FIG. 3A, vehicle 304 is located such that it functions as an obstruction for signal B 307B and thus vehicle 304 blocks signal B 307B before signal B 307B can reach vehicle 306. Because vehicle 306 has not received (and cannot receive) signal B 307B, vehicle 306 does not respond to signal B 307B. In contrast, signals A 307A and C 307C are non-LOS signals, which are able to curve around vehicle 304. Because these curved signals do not require LOS between the sender and the receiver, and because a curved path of the signal may be selected to permit the signals to travel between vehicle 304 and any adjacent vehicles, vehicle 306 is able to receive signals A 307A and C 307C, and vehicle 306 can respond accordingly. It is noted that vehicle 308 is situated such that signal A 307A must travel between vehicle 308 and vehicle 304. In selecting the parameters for the FDA signal 307A, and considering the above description of FDA signals and path selection therefor, the parameters for signal A 307A may be selected such that the primary signal path travels between vehicle 302 and vehicle 306. For any initial measurements to determine said signal path, such as a relative distance and/or position of vehicle 308 from vehicle 302 and a relative distance and/or position of vehicle 304 from vehicle 302, any known method may be used, including, but not limited to, transmission of position information (e.g., GPS information), derivation of distance and/or position from one or more image sensors (e.g., photogrammetry), etc.

Similarly, in FIG. 3B, vehicle 310 is traveling with vehicle 312 on its left and with vehicle 314 in front. If vehicle 310 seeks to communicate with vehicle 314, vehicle 310 may establish a LOS connection and an FDA connection in one direction with vehicle 314, but an FDA communication in another direction will be blocked. Specifically, vehicle 312 will block FDA signal 315A, but vehicle 310 can communicate with vehicle 314 using signals 215B and 315C. Alternatively, if vehicle 310 wishes to communicate directly with vehicle 312, vehicle 310 may select FDA signal 315A to reach only vehicle 312.

A comparison of a receipt or a non-receipt of a LOS signal with a receipt or non-receipt of a non-LOS signal may yield additional and valuable information about the relationships of objects. For example, if a non-LOS (a curved) signal and an LOS (linear) signal are both received (this may be verified by receiving a response or ping from the receiving station), it may be assumed that the receiving station is in a vicinity of the transmitting device and that an unobstructed line of sight exists between the transmitting device and the receiving station. On the other hand, if a non-LOS signal is received by a receiving station, but the receiving station cannot/does not receive a LOS signal, then it may be assumed that an obstruction is present along a line between the transmitting device and the receiving station.

Moreover, some signals may change between being received and not being received, based on relative arrangements of the vehicles. This may be referred to herein as "dynamic blocking". According to one aspect of the disclosure, the dynamic blocking of signals can allow a system to make determinations about whether objects are within LOS to each other. This may permit at least a crude dynamic mapping of the likely location of objects relative to the ego vehicle.

The mapping of this model as described herein may be robust compared to mapping strategies based on image sensors, which may be significantly impaired by rain, snow, dirt, and the like. That is, many conventional positioning or mapping systems rely heavily or exclusively on visual sensors (image sensors, camera, video cameras, LIDAR, etc.), whose ability to receive data are subject to deterioration from inclement weather conditions, such as rain, snow, sleet, hail, or even the presence of dust, smoke, fog, etc. Such conditions do not affect the LOS and non-LOS radio-frequency (RF) signal transmission described herein, and as such, they are able to be used for positioning and mapping even instead of, or in conjunction with, conventional image sensors.

A rule-based model may allow a system to provide an estimation of many object locations.

The dynamic map can be shared between vehicles. Such dynamic map shared may improve knowledge of the surroundings by sharing information among vehicles. Such dynamic map sharing may also result in improved mapping, as vehicles in different physical locations may be able to gather additional information about their surroundings and thus correct or refine an existing map. These functions may bolster safety and prevent cascaded accidents as a part of an advanced sensor-fusion system together with camera and LIDAR, leveraging a machine learning methodology.

According to an aspect of the disclosure, the methods and principles expressed herein may permit object locations to be exposed through comparisons among radio pings across a range of curvature. Responding devices may report dynamic live data, such as type of object (e.g., car, pedestrian, bicycle), rate and acceleration, direction of motion, etc., to allow various responses to collision avoidance or path navigation. Stationary Multi-access Edge Computing devices ("MECs") may have a special significance in the mesh since they may be located at a precisely known position. MEC radios on the periphery of a visual and radio obstruction may report a frequency pattern that takes the radio obstructions into account. GPS may optionally be used to determine whether devices are in the same general vicinity, and then the subject matter disclosed herein could be used to compare to a map of proximity risks (i.e., if proximity looks risky by GPS but radio connectivity is not happening, an obstruction could be inhibiting radio waves and visual detection).

According to an aspect of the disclosure, the principles and methods disclosed herein may reduce "shadow regions" in a vicinity of a vehicle, at least by providing information related to the location of vehicles that cannot be directly visualized (non-LOS vehicles). This may further the Advanced Driver-Assistance Systems ("ADAS") goals, which place a strong emphasis on safety.

The principles and methods described herein may transmit and/or receive signals according to FDA. In a conventional signal transmission, same-frequency signals from each element antenna in conventional phased array may be combined coherently in a straight-line path, which is only an angular-dependent (i.e., straight) beam (e.g., in current V2X mmWave applications). Compared to this conventional approach, an implementation of FDA may be utilized. In FDA, different-frequency signals are injected to element antennas in an FDA, and these signals are combined in a designed, curved path in a time domain. Essentially, FDA enables both range- and angle-dependent transient beam patterns. The conventional phased array is a subset of the FDA architecture, meaning that FDA architecture can be dynamically reconfigured to support straight beams or curved beams. In addition, FDA steers beams automatically without necessitating phase shifters or frequency sweeps. A typical beam steering range of FDA is wider than that of a phased array because FDA has significantly reduced mutual couplings between element antennas.

Figure 4A:
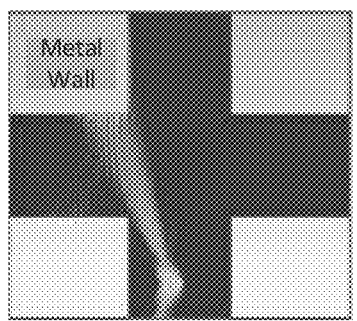
FIGS. 4A, 4B, and 4C depict radiating beam patterns of both a conventional phased array and an FDA.
Figure 4B:
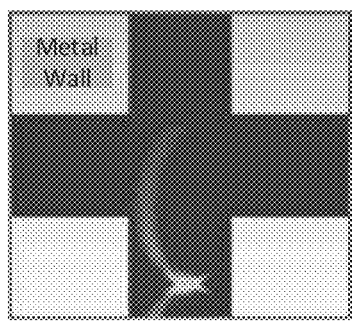
Figure 4C:
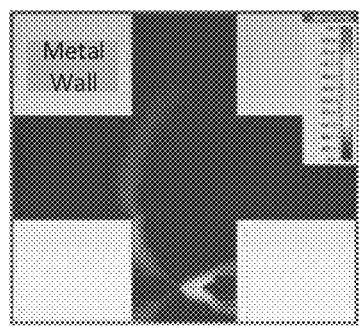

In FIGS. 4A, 4B, and 4C, simulated radiating beam patterns of both a conventional phased array and an FDA may be compared with each other under a traffic intersection scenario. By way of example, the images depict signals as transmitted in an eight-element MIMO antenna array. The number of MIMO antennas should not be understood as being limited to eight, and can be greater or fewer as desired for the implementation. Buildings are depicted as a metallic box for a faster computation speed, without losing generality. 4A depicts a simulation of a conventional beam, which manifests as a straight beam. FIG. 4B depicts a curved beam due to an FDA transmission. FIG. 4C depicts a beam that is curved as a result of striking a metal wall. Of note, the FDA beam of FIG. 4B remains primarily in the designed path even when it strikes part of the building structure, as shown in the beam of FIG. 4C.

FIGS. 5A, 5B, and 5C depict the use of a conventional phased array and an FDA to reach a non-LOS target. In FIG. 5A, an antenna array 502 (i.e., an array on a first vehicle) is depicted at the bottom portion of the image. A transmission target 504 is depicted at the top portion of the image. Between the antenna array and the transmission target, an obstruction 506 (e.g. a car/vehicle) is depicted. The obstruction 506 renders the target 504 a non-LOS target relative to the antenna array. FIG. 5B depicts an attempt to communicate with the transmission target using a conventional phased array, as transmitted from the antenna array 502. Because the conventional phased array is transmitted on a path whose angle does not change relative to time (i.e., a straight path), the obstruction 506 interrupts the transmission on the way to the target, and communication with the non-LOS target cannot be reliably established. Although some situations may permit communication with the non-LOS target through reflection (not depicted), such reflection-dependent communication may be unreliable and unpredictable, or at least very challenging to predict. FIG. 5C depicts communication with the transmission target using a FDA. In this case, it can be seen that the FDA beam changes angle relative to time (i.e., the beam follows a curved path). This permits a beam to be formed that essentially travels around the obstruction and reaches the intended target, even when there is no LOS between the transmitting antenna array and the target. Furthermore, as can be seen in this image, the beam's path may even be selected to clear not only the obstructions that preclude a LOS (in this case, obstruction 506), but also other obstructions that may be present (e.g., the building in the upper left corner of FIG. 5C and the building in the bottom left corner of FIG. 5C). With knowledge of these obstructions, a suitable FDA beam configuration may be selected such that the beam's path of travel clears the obstructions and reaches the intended target. The beam can be further narrowed by using more antennas, similar to the conventional phased array antenna.

Using the techniques described herein, the system may detect obstructions (e.g., such as with LIDAR) and use the radio signal monitoring to determine movement of a target relative to an obstruction, or perhaps more accurately, to estimate that a LIDAR-detected object (or an object detected by another sensor) has become an obstruction relative to the target.

Figure 6:
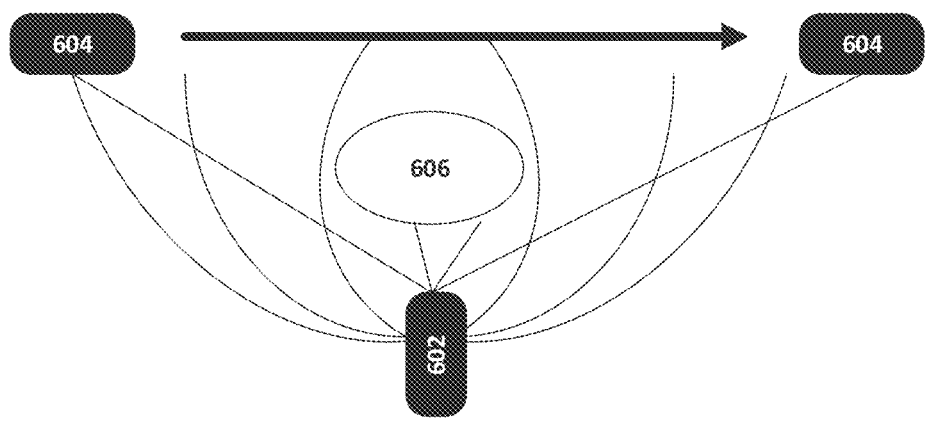
FIG. 6 depicts a stylized example of a series of LOS and non-LOS signals.

FIG. 6 shows a stylized example of a series of LOS and non-LOS signals. In this figure, a first vehicle 602 is in the foreground, and a second vehicle 604 is shown moving from the left portion of the figure to the right portion of the figure, in the background. An obstruction 606 is between the first vehicle 602 and the second vehicle 604. The first vehicle 602 sends both LOS signals and non-LOS signals (displayed as straight lines and curved lines, respectively). As the second vehicle 604 moves from left to right, the first vehicle 602 pings the second vehicle 604. As the second vehicle 604 becomes obstructed from the first vehicle 602 due to the obstruction 606, the LOS signal/response on the left is lost before the non-LOS signal/response, thus the system can determine that the second vehicle 604 has moved from the left to a position behind the obstruction 606. When the second vehicle 604 emerges on the right from behind the obstruction 606, the non-LOS signal/response occurs, followed by the LOS, thus indicating an emergence from the right side of the obstruction.

This can be utilized to map target objects with embedded radios that respond to pings. According to a first aspect, the series of beam-formed, non-LOS signals/responses can be used to determine the trajectory of a vehicle as the target radio responds or does not respond to the series of signals. According to a second aspect of the disclosure, if a non-LOS beam of a known curvature and a straight LOS reach a target at generally the same time, the difference between an LOS and a non-LOS signal-response loop could allow estimation of distance of an obscured device on the response side (see discussion of spherical cap below). According to a third aspect, these principles can be applied to both 2D and 3D spaces. As such, this may be implemented for land-based vehicles (cars, trucks, etc.) as generally described herein, but also for aircraft (unmanned aerial vehicles/drones, airplanes, helicopters, etc.).

According to another aspect of the disclosure, an environment/vicinity of an FDA transmitter can be mapped using this approach. That is, multiple signals of various sized may be emitted, and the resulting pings could be used to map the vicinity. This procedure is shown in greater detail in FIG. 7.

Figure 7:
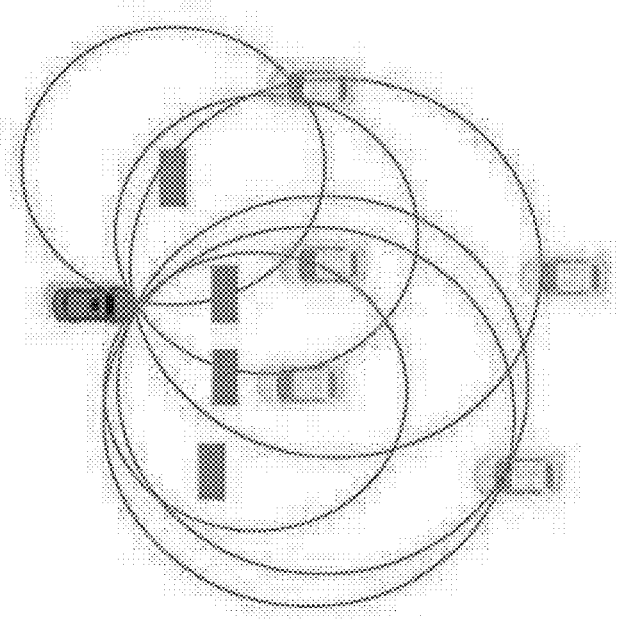
FIG. 7 depicts vicinity mapping using a plurality of beams with known curve radii and known curve distances.

As depicted in FIG. 7, vicinity mapping can be carried out by sending a plurality of beams with known curve radii and known curve distances. If a curve's radius can be estimated, the curve's circumference can be determined. The FDA beam can be used with a two-way ping/ping request, which triggers communication between the ego device and the target device. This communication can be used to perform a rough estimation of the time that the beam took to travel from the ego device to the target device and/or from the target device to the ego device. Because the beams travel at the speed of light, a known or estimated duration of travel time can be used to determine an estimated distance of travel. The estimated distance of travel along with a known path of travel (i.e., based on the FDA beam curvature) can be used to estimate a location of the target device relative to the ego device. That is, the 2-way ping between the ego device and the target device reveal an estimated distance of the signal along the curve, and the estimated distance (and therefore the cap height) can be used to determine the diameter of the spherical cap as an example, which would be the straight-line distance between the ego device and the target device.

Figure 8:
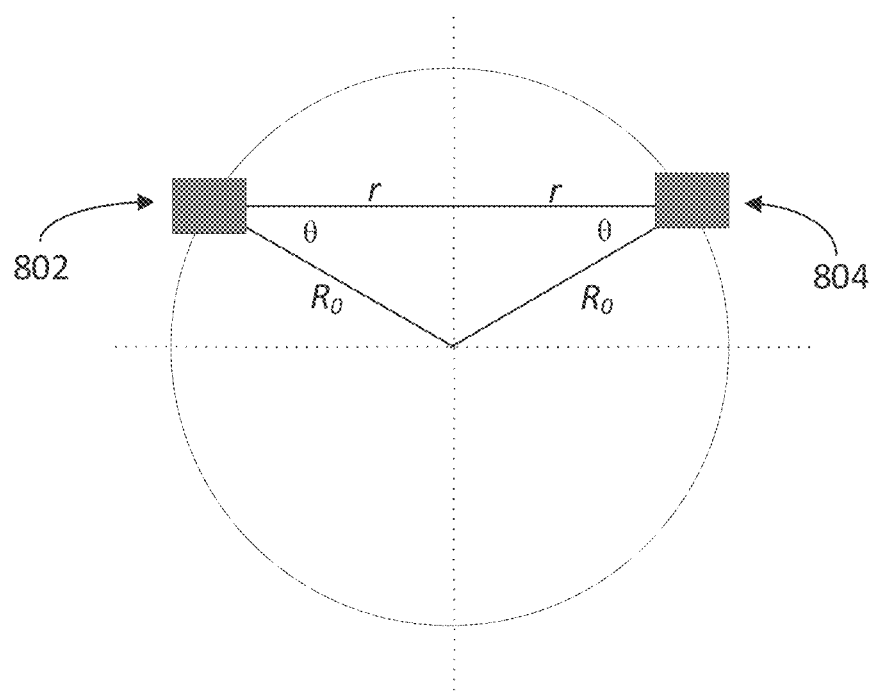
FIG. 8 depicts a distance calculation between a first device and a second device.

This calculation is depicted in greater detail in FIG. 8 as a calculation between a first device 802 and a second device 804. The distance between the first device 802 and the second device 804 may be calculated as a spherical cap base distance, as depicted by r. The spherical cap radius may be derived from the angle $\theta_{Max}$, for a given time (t) and radius ($R_0$), wherein the peak amplitude occurs at $\theta_{Max}$, assuming a polar coordinate as:

$$\theta_{Max}(t, R_0) = \sin^{-1}\left(\frac{\Delta_\omega(R_0 - c_0 t)}{\omega_0 d}\right) \quad (5)$$

where $c_0$ is the speed of light, $\omega_0$ is a reference angular frequency; d is the physical separation distance between adjacent element antennas (typically half wavelength); and $\Delta_\omega$ is the difference between angular frequencies of injecting signals to element antennas. Once $\theta_{Max}$ is determined, r may be derived using basic geometric analysis, such as, but not limited to, determining r as the product of the $\cos(\theta_{Max})$ and $R_0$.

Figure 9:
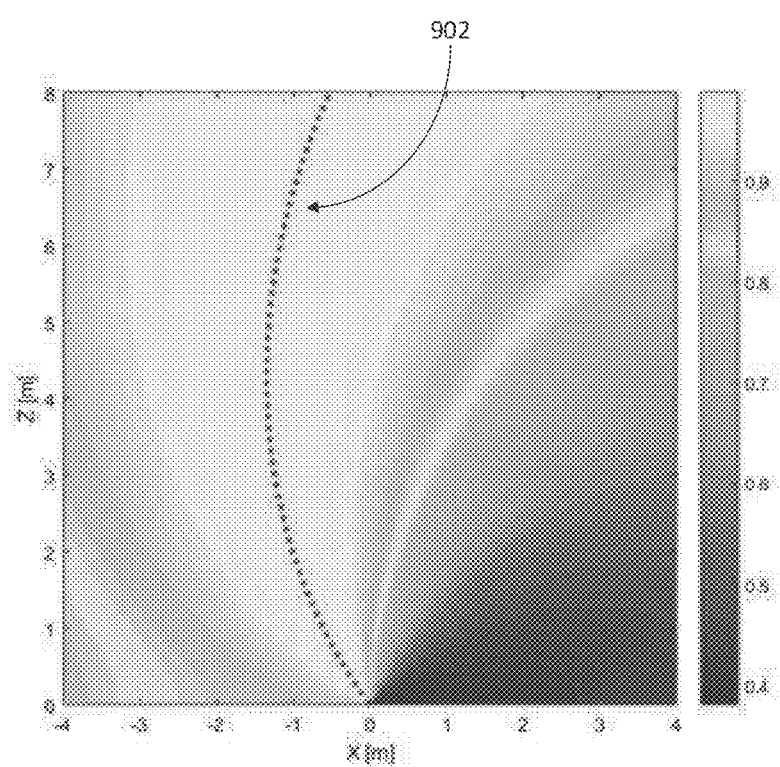
FIG. 9 depicts a locus of estimated energy maximum locations on a curved beam.

FIG. 9 depicts a locus of estimated energy maximum locations based on a curved beam. The locus measurement may be depicted along an x-axis and a z-axis, as depicted herein. The dotted curve 902 depicts the maximum curve on top of FDA radiation field distribution and it matches the maximum field locations.

Since messages between devices (i.e. between vehicles) can include information of the vehicle sending the signals (ID, location, speed, etc.), the receiving vehicle can respond to the sending vehicle, thereby creating a closed loop communication between vehicles.

Given the time dependency, even if both sender and receiver are stationary, and there are no changes in the environment, the beam patterns will still change over time. This can largely be avoided, however, by implementing one or more strategies to contain the beam within a limited range of angles. This may be achieved by "resetting" the phase of the input signals to the FDA antenna. That is, the beam may be configured to oscillate or toggle between pre-defined angles, which may be selected, depending on the implementation, within a relatively small range. The result will cause the beam to remain essentially unchanged and the resulting beam will essentially look like a quasi-stationary curved beam.

The dotted curve 902 (max curve) may sweep through different regions over time and lead to the automatic angular sweeping. The dotted curve 902 only shows the field-maximum location for a given time, as a reference, as an example of estimating the communication-link path.

The angular sweep range could be 160+ degrees. The sweep speed may be 1/(frequency difference between antenna elements). For example, if different 10-MHz signals are injected between adjacent antennas, the entire sweep time (sweeping 180 degrees) will be 100 nanoseconds. If the frequency difference is increased, the sweeping time may be even faster. It is advantageous that the popular mmW spectrum offers a large frequency range. Once again, and as an alternative, the phase of the signals can be "reset", thus, the sweep time can be reduced if the beam sweeping angle is limited.

According to another aspect of the disclosure, the principles and methods disclosed herein may be implemented in the context of a rule-based procedure (i.e., an algorithm) to infer location or trajectory of a target vehicle in the context of safety. To generalize the solution to use many signals in a much larger set of scenarios, machine learning-based approaches may be particularly useful, especially if datasets annotated with ground-truth can be collected across all relevant scenarios to train appropriate machine learning models for safety inference. While the number of features could be large, the data itself may be rather structured and can be modeled, for example by using Hidden Markov Model ("HMM") or even Support Vector Machines ("SVM") or decision tree if timing features, e.g., speed of the tracked device, etc., are encoded into the feature vectors. For example, if raw data or specific features extracted from raw data can be converted from the various sensors into a labeled dataset, n machine learning models can be trained based on HMM or simple Neural Network ("NN").

FIG. 10 depicts a table for the conversion of raw data (or extracted features) into a labeled dataset. According to one aspect of the disclosure, the raw data may include only radio signals (single modality) or data from a plurality of different sensors. Said sensor data may include, e.g., camera and LIDAR, etc., in a sensor-fusion approach. In this figure, which is presented herein as an example configuration, but which should not be understood to be limiting, the time data associated with-transmission to a target and/or transmission time to from the target to the ego unit is recorded for each of a plurality of signals comprising both LOS and non-LOS signals. The recorded data may include time of travel, timestamp for transmission, timestamp for receipt, any characteristics of the LOS-beam(s) (direction, gain, signal strength, or any other factor), or any characteristics of the non-LOS beam(s) (direction, curvature, gain, signal strength, or any other factor).

Figure 11:
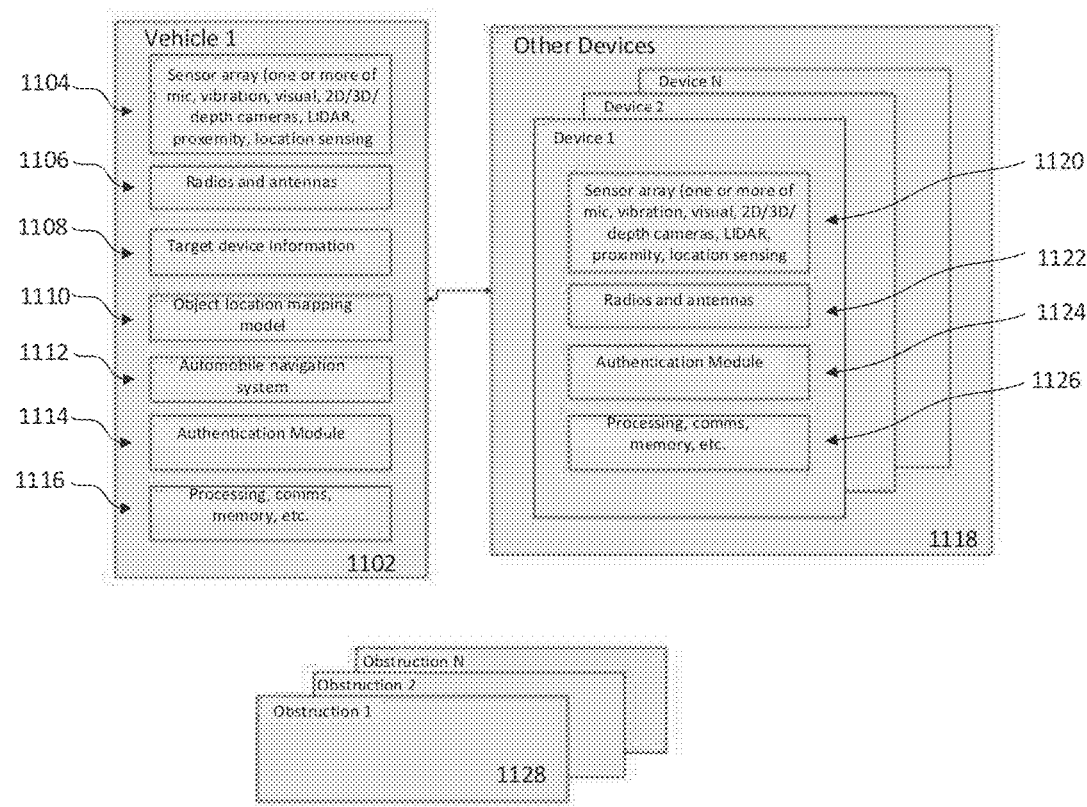
FIG. 11 depicts FDA detection in a system, according to an aspect of the disclosure.

FIG. 11 depicts FDA detection in a system, according to an aspect of the disclosure. The system may comprise a first device 1102, which is labeled herein as vehicle one; however, it should be noted that the principles and methods described herein are not limited to use in vehicles but could be applied to devices in a variety of forms. The system may further comprise one or more other devices 1118, with which the first device 1102 communicates. These devices may be, permanently, or only temporarily, separated from one another by one or more obstructions 1128.

The first device 1102 may comprise a plurality of sensors and systems, which may allow for the first device 1102 to produce one or more LOS-signals and/or one or more non-LOS signals, and using the signals, estimate and/or map locations of the one or more other devices 1118 and/or the one or more obstructions 1128. The plurality of sensors and systems of the first device 1102 may include a sensor array (one or more of a microphone, a vibration sensor, a visual sensor/image sensor, one or more cameras (2D/3D/depth camera), one or more lidar sensors, one or more proximity sensors, and one or more location sensors) 1104. This may further include one or more radios and antennas 1106; target device information 1108; an object location mapping model 1110; an automobile navigation system 1112; an authentication module 1114; and one or more processors, one or more communications devices (transmitters, receivers, transponders, etc.), one or more memories, etc. 1116.

The other devices 1118 may comprise any of a sensor array (one or more of a microphone, a vibration sensor, a visual sensor/image sensor, one or more cameras (2D/3D/depth camera), one or more lidar sensors, one or more proximity sensors, and one or more location sensors) 1120; one or more radios and antennas 1122; an authentication module 1124; and one or more processors, one or more communications devices (transmitters, receivers, transponders, etc.), one or more memories, etc. 1126.

FIG. 12 depicts a positioning method according to a first aspect of the disclosure, comprising transmitting a first wireless signal along a first signal path having a first signal path angle that changes relative to time 1202; receiving second wireless signal data representing a response of a wireless station to the first wireless signal 1204; and determining a first position of the wireless station based at least on the first signal path and the second wireless signal data 1206.

FIG. 13 depicts a positioning method according to a second aspect of the disclosure, comprising transmitting a first wireless signal along a first signal path having a first signal path angle that changes relative to time 1302; receiving second wireless signal data representing a response of a wireless station to the first wireless signal 1304; transmitting a third wireless signal along a second signal path 1306; and generating an assumption that an obstruction is between the wireless communication device and the wireless station if the wireless communication device receives a response from the wireless station to the first wireless signal but does not receive a response from the wireless station to the third wireless signal 1308; wherein the second signal path is a linear path 1310.

FIG. 14 depicts a positioning method according to a third aspect of the disclosure, comprising transmitting a first wireless signal along a first signal path having a first signal path angle that changes relative to time 1402; receiving second wireless signal data representing a response of a wireless station to the first wireless signal 1404; transmitting a third wireless signal along a second signal path 1406; and generating an assumption that a LOS is present between the wireless communication device and the wireless station if the wireless communication device receives a response from the wireless station to both the first wireless signal and the third wireless signal 1408; wherein the second signal path is a linear path 1410.

According to one aspect of the disclosure, the FDA technology described herein may be utilized for positioning of objects (vehicles, devices, wireless communication stations, or any other object capable of wireless communication). Although positioning with pings and/or round-trip time is generally known, these known methods typically or exclusively rely on linear communication for measurement of signal travel time, and therefore for determination of relative distances between the transmitter and receiver. As described herein, linear signal communication may be undesirable or impossible, depending on the surroundings of the transmitter and receiver, and particularly when one or more obstructions are located along a linear path between the transmitter and receiver. This may become particularly important as wireless communication technology adopts smaller wavelengths, (e.g. millimeter wavelengths), which may behave differently from transmissions of longer wavelengths and may be more subject to diminishment from obstructions along a linear path. The ability to use FDA signals to evade or transmit around or between one or more obstructions may be of particular relevance as millimeter wavelengths become more commonplace.

In common positioning techniques using pings or round-trip time, a signal is transmitted linearly between a transmitter and receiver, and a response is then sent back to the original-transmitting device, said response (utilizing any of a variety of known methods) permitting a measurement or estimation of the transmission time between the devices. Knowing that the signals travel at the speed of light, a distance between the transmitter and receiver can be calculated. Although these methods are subject to an error tolerance, the results are often sufficiently accurate to make positioning determinations and/or to map physical relationships of objects relative to one another.

These principles can be applied to a transmission of FDA beams. In an FDA beam, the beam travels along a path whose transmission angle changes relative to time, and thus appears as a curved path. The degree of curvature may be known, and thus by using known geometric techniques, the length of the path of travel (representing an arc of the circular path of travel) may be determined. In FDA communications, the signal travels at the speed of light along this arc or circular path of travel. Thus, by determining the length of transmission time between transmitter and receiver, a length of the arc traveled may also be determined. Once the length of the arc is determined, the linear distance between the transmitter and receiver may be determined as a circular cap or a chord. Furthermore, an angle or direction of travel may be calculated for a linear path between the transmitter and receiver.

Upon calculation of the circular cap or chord, the calculated distance may be used for mapping or positioning. That is, by using the calculated distance and the angle or direction of travel for the linear path, a relative positioning of the transmitter and receiver with respect to one another may be achieved. This may be simply notated in a positioning record or may be mapped. The mapping may be achieved using any mapping method, without limitation. The mapping may include only the position of the transmitter and receiver. The mapping may alternatively include the position of the transmitter and receiver along with one or more other objects including, but not limited to, obstructions, buildings, and/or other objects for which positioning information has been obtained or calculated.

According to another aspect of the disclosure, additional information may be obtained by transmitting two or more signals along different signal paths and comparing the corresponding responses. This may be effectuated in at least two circumstances: first, when one of the two transmissions is an FDA signal and the other of the two transmissions is a linear transmission; and second, when both of the transmissions are FDA transmissions. These will be addressed in turn.

First, additional information may be obtained by transmission of two signals, wherein one signal is an FDA signal along a curved path, and the other signal is a non-FDA signal along a linear path. In this case, the signal responses, or lack thereof, may be used for positioning and/or to evaluate the presence of an obstruction. According to one aspect, a first signal may be sent along a non-LOS (curved) path, and a second signal may be sent along a LOS (linear) path. If a response to both signals is received from another station or device, it may be assumed that the device received both transmissions. This indicates that an obstruction is neither present along the non-LOS path nor the LOS path. In this manner, the distances of travel of each of the signals may be determined based on the ping or signal travel time, and the responses may be used to improve accuracy and positioning information over positioning based only on response to one signal. For example, since the circular path of the non-LOS signal is known, and approximate position of the receiving device may be derived from the circular path and the calculated distance of travel. This approximate position may be refined by determining the point of intersection of the angular path of travel and the circular path of travel. Moreover, and according to another aspect, the accuracy of said system may be evaluated based on the relationship of the determined position along the circular path and the determined position along the linear path. If these determined positions closely correspond, it may be assumed that the calculation has a high accuracy. If the calculations are disparate, it may be assumed that the accuracy is reduced.

According to another aspect, and in the case that a first transmission is along a non-LOS (circular) path and the second transmission is along a LOS (linear) path, the response(s) from the receiving device may be used to determine the presence of one or more obstructions. That is, if a response is received from one of the signals, but not the other, it may be assumed that an obstruction is present along the signal path for which no response was received. For example, in the case that response to a non-LOS signal is received, but no response to a LOS signal is received, then it may be assumed that an obstruction is present along the linear path of the LOS signal, but that no obstruction is present along the non-LOS path. Conversely, if a response to the LOS signal is received, but no response to the non-LOS signal is received, then it may be assumed that an obstruction is present along the non-LOS path, but that no obstruction is present along the LOS path. In this manner, the presence of an obstruction may be mapped.

According to another aspect, two or more non-LOS signals may be transmitted, and responses to these two or more signals may be used for positioning. In this manner, a first non-LOS signal may be transmitted along a first circular path, and a second non-LOS signal may be transmitted along a second circular path, the second circular path being different from the first circular path. The position of the responding device may be assumed to be at or near a point of intersection between the first circular path and the second circular path. This assumed position may be mapped. According to another aspect, the position of the device may be determined based on a signal travel time along both the first circular path and the second circular path, using the techniques described herein. If the determined position based on the travel time along the first circular path is closely related to the determined position based on the travel time along the second circular path, a high degree of accuracy may be assumed. If the two determined positions are disparate, a reduced amount of accuracy may be assumed.

The combination of non-LOS signals and LOS signals may be utilized over a period of time to better detect the presence of obstacles. This may be particularly relevant with vehicles or other objects that are moving. For example, it may be desired to determine positioning information for a moving vehicle, wherein said vehicle may be traveling, for the purposes of this hypothetical, from west to east. According to the procedures described herein, both a non-LOS and a LOS signal may be sent to the vehicle. If responses to both signals are received from the vehicle, it may be assumed that no obstruction is present between the transmitter and the vehicle. As the vehicle travels from west to east, the vehicle may travel behind an obstruction that lies along a linear path between the transmitter and the vehicle. In this case, it would be expected that a LOS signal to the vehicle would not receive a response, but that a non-LOS signal to the vehicle could be configured to travel around the obstruction, reach the vehicle, and receive a response. In this manner, it may be assumed that the obstruction is between the transmitter and the vehicle. Eventually, as the vehicle continues to travel from west to east, the vehicle will reach a position for which a LOS is present between the transmitter and the vehicle. That is, the vehicle will reach a position for which the obstruction is no longer present along a linear path between the transmitter and the vehicle. At this point, it would be assumed that both the non-LOS and the LOS signals will reach the vehicle and be responded to. In this manner, it can be assumed that the obstruction is no longer between the transmitter and the vehicle. Furthermore, by determining the angle of transmission of the linear LOS signal at the point at which the responses ceased and/or by determining the angle of transmission of the linear LOS signal at the point at which the responses resumed, a position of the obstruction may be refined.

According to an aspect of the disclosure, the transmitted signals (first signal, third signal, etc.) may include one or more indicators of the signal path on which they were transmitted. These indicators may then be used by the responding device to transmit the response along the same path. For example, a non-LOS signal may include information about the non-LOS transmission path (i.e. frequency information, phase information, physical coordinates, or any other information to assist the receiving device to reply along the same path). The receiving device may receive the non-LOS signal and detect from the signal the transmitted information about the signal path. The receiving device may then use this detected information to transmit a reply along the same signal path in the opposite direction. This may also apply to LOS-signals. For a LOS-signal, the transmitted signal may include information about the linear transmission path, and the receiving device may detect this information and use same to respond along the same signal path in reverse.

In the following, various examples are described that may refer to one or more aspects of the disclosure.

In Example 1, a wireless communication device is disclosed, comprising one or more transceivers; and one or more processors, configured to control the one or more transceivers to transmit a first wireless signal along a first signal path having a first signal path angle that changes relative to time; receive from the one or more transceivers second wireless signal data representing a response of a wireless station to the first wireless signal; determine a first position of the wireless station based at least on the first signal path and the second wireless signal data.

In Example 2, the wireless communication device of Example 1 is disclosed, wherein the one or more processors are further configured to determine from the second wireless signal data a first duration of travel of the first wireless signal between the wireless communication device and the wireless station; and wherein the one or more processors are configured to determine the first position of the wireless station further based at least on the first duration of travel.

In Example 3, the wireless communication device of Example 1 or 2 is disclosed, wherein the first wireless signal is transmitted according to a frequency-diverse array.

In Example 4, the wireless communication device of any one of Examples 1 to 3 is disclosed, wherein the first signal path is a curved path.

In Example 5, the wireless communication device of any one of Examples 2 to 4 is disclosed, wherein the first duration of travel is a round trip time.

In Example 6, the wireless communication device of any one of Examples 1 to 5 is disclosed, wherein determining the first position of the wireless station comprises determining a position of the wireless station along the first signal path.

In Example 7, the wireless communication device of Example 6 is disclosed, wherein the one or more processors are further configured to determine a linear distance between the wireless communication device and the determined position of the wireless station along the first signal path.

In Example 8, the wireless communication device of any one of Examples 1 to 7 is disclosed, wherein the one or more processors are further configured to control the one or more transceivers to transmit a third wireless signal along a second signal path.

In Example 9, the wireless communication device of Example 8 is disclosed, wherein the second signal path is a linear signal path.

In Example 10, the wireless communication device of Example 9 is disclosed, wherein the one or more processors are further configured to generate an assumption that an obstruction is between the wireless communication device and the wireless station if the wireless communication device receives a response from the wireless station to the first wireless signal but does not receive a response from the wireless station to the third wireless signal.

In Example 11, the wireless communication device of Example 9 is disclosed, wherein the one or more processors are further configured to generate an assumption that a line of sight is present between the wireless communication device and the wireless station if the wireless communication device receives a response from the wireless station to both the first wireless signal and the third wireless signal.

In Example 12, the wireless communication device of Example 8 is disclosed, wherein the one or more processors are further configured to receive from the one or more transceivers fourth wireless signal data representing a response of the wireless station to the third wireless signal; determine from the fourth wireless signal data a second duration of travel of the third wireless signal from the wireless communication device to the wireless station; determine a position of the wireless station based on at least one of the first signal path and the first duration of travel and at least one of the second signal path and the second duration of travel.

In Example 13, the wireless communication device of Example 12 is disclosed, wherein the second signal path is characterized by a second signal path angle that changes relative to time.

In Example 14, the wireless communication device of Example 12 or 13 is disclosed, wherein the third wireless signal is a frequency diverse array signal.

In Example 15, the wireless communication device of any one of Examples 8 to 14 is disclosed, wherein the second signal path is a linear signal path.

In Example 16, the wireless communication device of Example 15 is disclosed, wherein a line of sight connection exists between the wireless communication device and the wireless station.

In Example 17, the wireless communication device of any one of Examples 8 to 16 is disclosed, wherein the second signal path is different from the first signal path.

In Example 18, the wireless communication device of any one of Examples 8 to 17 is disclosed, wherein the position of the wireless station is determined based on an intersection of the first signal path and the second signal path.

In Example 19, the wireless communication device of any one of Examples 1 to 18 is disclosed, wherein the one or more processors are further configured to generate a map comprising the location of the wireless station.

In Example 20, the wireless communication device of Example 19 is disclosed, wherein the location of the wireless station comprises a location of the wireless station relative to the wireless communication device.

In Example 21, the wireless communication device of Example 19 is disclosed, wherein the location of the wireless station comprises an absolute location of the wireless station relative to the earth.

In Example 22, a positioning method is disclosed, comprising: transmitting from a wireless communication device a first wireless signal along a first signal path having a first signal path angle that changes relative to time; receiving second wireless signal data representing a response of a wireless station to the first wireless signal; determining a first position of the wireless station based at least on the first signal path and the second wireless signal data.

In Example 23, the positioning method of Example 22 is disclosed, further comprising determining from the second wireless signal data a first duration of travel of the first wireless signal between the wireless communication device and the wireless station; and determining the first position of the wireless station further based at least on the first duration of travel.

In Example 24, the positioning method of Example 22 or 23 is disclosed, wherein the first wireless signal is transmitted according to a frequency-diverse array.

In Example 25, the positioning method of any one of Examples 22 to 24 is disclosed, wherein the first signal path is a curved path.

In Example 26, the positioning method of any one of Examples 22 to 25 is disclosed, wherein the first duration of travel is a round trip time.

In Example 27, the positioning method of any one of Examples 22 to 26 is disclosed, wherein determining the first position of the wireless station comprises determining a position of the wireless station along the first signal path.

In Example 28, the positioning method of Example 27 is disclosed, further comprising determining a linear distance between the wireless communication device and the determined position of the wireless station along the first signal path.

In Example 29, the positioning method of any one of Examples 22 to 28 is disclosed, further comprising controlling the one or more transceivers to transmit a third wireless signal along a second signal path.

In Example 30, the positioning method of Example 29 is disclosed, wherein the second signal path is a linear signal path.

In Example 31, the positioning method of Example 30 is disclosed, further comprising generating an assumption that an obstruction is between the wireless communication device and the wireless station if the wireless communication device receives a response from the wireless station to the first wireless signal but does not receive a response from the wireless station to the third wireless signal.

In Example 32, the positioning method of Example 30 is disclosed, further comprising generating an assumption that a line of sight is present between the wireless communication device and the wireless station if the wireless communication device receives a response from the wireless station to both the first wireless signal and the third wireless signal.

In Example 33, the positioning method of Example 29 is disclosed, further comprising: receiving from the one or more transceivers fourth wireless signal data representing a response of the wireless station to the third wireless signal; determining from the fourth wireless signal data a second duration of travel of the third wireless signal from the wireless communication device to the wireless station; determining a position of the wireless station based on at least one of the first signal path and the first duration of travel and at least one of the second signal path and the second duration of travel.

In Example 34, the positioning method of Example 33 is disclosed, wherein the second signal path is characterized by a second signal path angle that changes relative to time.

In Example 35, the positioning method of Example 33 or 34 is disclosed, wherein the third wireless signal is a frequency diverse array signal.

In Example 36, the positioning method of any one of Examples 29 to 35 is disclosed, wherein the second signal path is a linear signal path.

In Example 37, the positioning method of Example 36 is disclosed, wherein a line of sight connection exists between the wireless communication device and the wireless station.

In Example 38, the positioning method of any one of Examples 29 to 37 is disclosed, wherein the second signal path is different from the first signal path.

In Example 39, the positioning method of any one of Examples 29 to 38 is disclosed, wherein the position of the wireless station is determined based on an intersection of the first signal path and the second signal path.

In Example 40, the positioning method of any one of Examples 22 to 39 is disclosed, further comprising generating a map comprising the location of the wireless station.

In Example 41, the positioning method of Example 40 is disclosed, wherein the location of the wireless station comprises a location of the wireless station relative to the wireless communication device.

In Example 42, the positioning method of Example 40 is disclosed, wherein the location of the wireless station comprises an absolute location of the wireless station relative to the earth.

In Example 43, a positioning method is disclosed, comprising: transmitting a first wireless signal along a first signal path having a first signal path angle that changes relative to time; receiving second wireless signal data representing a response of a wireless station to the first wireless signal; transmitting a third wireless signal along a second signal path; and generating an assumption that an obstruction is between the wireless communication device and the wireless station if the wireless communication device receives a response from the wireless station to the first wireless signal but does not receive a response from the wireless station to the third wireless signal; wherein the second signal path is a linear path.

In Example 44, a positioning method is disclosed, comprising: transmitting a first wireless signal along a first signal path having a first signal path angle that changes relative to time; receiving second wireless signal data representing a response of a wireless station to the first wireless signal; transmitting a third wireless signal along a second signal path; and generating an assumption that a line of sight is present between the wireless communication device and the wireless station if the wireless communication device receives a response from the wireless station to both the first wireless signal and the third wireless signal; wherein the second signal path is a linear path.

In Example 45, one or more non-transient computer readable media is disclosed, configured to cause one or more processors, when executed, to carry out of the method of any one of Examples 22 to 44. In Example 46, a positioning means is disclosed, comprising one or more transceiving means; and one or more processing means, configured to control the one or more transceiving means to transmit a first wireless signal along a first signal path having a first signal path angle that changes relative to time; receive from the one or more transceiving means second wireless signal data representing a response of a wireless station to the first wireless signal; determine a first position of the wireless station based at least on the first signal path and the second wireless signal data.

In Example 47, the positioning means of Example 46 is disclosed, wherein the one or more processing means are further configured to determine from the second wireless signal data a first duration of travel of the first wireless signal between the positioning means and the wireless station; and wherein the one or more processing means are configured to determine the first position of the wireless station further based at least on the first duration of travel.

In Example 48, the positioning means of Example 46 or 47 is disclosed, wherein the first wireless signal is transmitted according to a frequency-diverse array.

In Example 49, the positioning means of any one of Examples 46 to 48 is disclosed, wherein the first signal path is a curved path.

In Example 50, the positioning means of any one of Examples 46 to 49 is disclosed, wherein the first duration of travel is a round trip time.

Example 51, the positioning means of any one of Examples 45 to 50 is disclosed, wherein determining the first position of the wireless station comprises determining a position of the wireless station along the first signal path.

In Example 52, the positioning means of Example 51 is disclosed, wherein the one or more processing means are further configured to determine a linear distance between the positioning means and the determined position of the wireless station along the first signal path.

In Example 53, the positioning means of any one of Examples 46 to 52 is disclosed, wherein the one or more processing means are further configured to control the one or more transceiving means to transmit a third wireless signal along a second signal path.

In Example 54, the positioning means of Example 53 is disclosed, wherein the second signal path is a linear signal path.

In Example 55, the positioning means of Example 54 is disclosed, wherein the one or more processing means are further configured to generate an assumption that an obstruction is between the positioning means and the wireless station if the positioning means receives a response from the wireless station to the first wireless signal but does not receive a response from the wireless station to the third wireless signal.

In Example 56, the positioning means of Example 54 is disclosed, wherein the one or more processing means are further configured to generate an assumption that a line of sight is present between the positioning means and the wireless station if the positioning means receives a response from the wireless station to both the first wireless signal and the third wireless signal.

In Example 57, the positioning means of Example 53 is disclosed, wherein the one or more processing means are further configured to: receive from the one or more transceiving means fourth wireless signal data representing a response of the wireless station to the third wireless signal; determine from the fourth wireless signal data a second duration of travel of the third wireless signal from the positioning means to the wireless station; determine a position of the wireless station based on at least one of the first signal path and the first duration of travel and at least one of the second signal path and the second duration of travel.

In Example 58, the positioning means of Example 57 is disclosed, wherein the second signal path is characterized by a second signal path angle that changes relative to time.

In Example 59, the positioning means of Example 57 or 58 is disclosed, wherein the third wireless signal is a frequency diverse array signal.

In Example 60, the positioning means of any one of Examples 53 to 59 is disclosed, wherein the second signal path is a linear signal path.

In Example 61, the positioning means of Example 60 is disclosed, wherein a line of sight connection exists between the positioning means and the wireless station.

In Example 62, the positioning means of any one of Examples 53 to 61 is disclosed, wherein the second signal path is different from the first signal path.

In Example 63, the positioning means of any one of Examples 53 to 62 is disclosed, wherein the position of the wireless station is determined based on an intersection of the first signal path and the second signal path.

In Example 64, the positioning means of any one of Examples 46 to 63 is disclosed, wherein the one or more processing means are further configured to generate a map comprising the location of the wireless station.

In Example 65, the positioning means of Example 64 is disclosed, wherein the location of the wireless station comprises a location of the wireless station relative to the positioning means.

In Example 66, the positioning means of Example 64 is disclosed, wherein the location of the wireless station comprises an absolute location of the wireless station relative to the earth.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. A wireless communication device, comprising:
   one or more transceivers; and
   one or more processors, configured to
      control the one or more transceivers to transmit a first wireless signal along a first signal path having a first signal path angle that changes relative to time;
      receive from the one or more transceivers second wireless signal data representing a response of a wireless station to the first wireless signal;
      determine a first position of the wireless station based at least on the first signal path and the second wireless signal data.

2. The wireless communication device of claim 1, wherein the one or more processors are further configured to determine from the second wireless signal data a first duration of travel of the first wireless signal between the wireless communication device and the wireless station; and wherein the one or more processors are configured to determine the first position of the wireless station further based at least on the first duration of travel.

3. The wireless communication device of claim 1, wherein the first wireless signal is transmitted according to a frequency-diverse array.

4. The wireless communication device of claim 1, wherein determining the first position of the wireless station comprises determining a position of the wireless station along the first signal path.

5. The wireless communication device of claim 1, wherein the one or more processors are further configured to control the one or more transceivers to transmit a third wireless signal along a second signal path.

6. The wireless communication device of claim 5, wherein the second signal path is a linear signal path.

7. The wireless communication device of claim 6, wherein the one or more processors are further configured to send a signal representing an assumption that an obstruction is between the wireless communication device and the wireless station if the wireless communication device receives a response from the wireless station to the first wireless signal but does not receive a response from the wireless station to the third wireless signal.

8. The wireless communication device of claim 7, wherein the one or more processors are further configured to send a signal representing an assumption that a line of sight is present between the wireless communication device and the wireless station if the wireless communication device receives a response from the wireless station to both the first wireless signal and the third wireless signal.

9. The wireless communication device of claim 5, wherein the one or more processors are further configured to:
receive from the one or more transceivers fourth wireless signal data representing a response of the wireless station to the third wireless signal;
determine from the fourth wireless signal data a second duration of travel of the third wireless signal from the wireless communication device to the wireless station;
determine a position of the wireless station based on at least one of the first signal path and the first duration of travel and at least one of the second signal path and the second duration of travel.

10. The wireless communication device of claim 9, wherein the second signal path is characterized by a second signal path angle that changes relative to time.

11. The wireless communication device of claim 9, wherein the third wireless signal is a frequency diverse array signal.

12. The wireless communication device of claim 9, wherein the second signal path is a linear signal path.

13. The wireless communication device of claim 9, wherein the position of the wireless station is determined based on an intersection of the first signal path and the second signal path.

14. The wireless communication device of claim 1, wherein controlling the one or more transceivers to transmit the first wireless signal along the first signal path having the first signal path angle that changes relative to time comprises controlling the one or more transceivers to transmit the first wireless signal along a curved signal path.

15. A positioning method, comprising:
transmitting from a wireless communication device a first wireless signal along a first signal path having a first signal path angle that changes relative to time;
receiving second wireless signal data representing a response of a wireless station to the first wireless signal; and
determining a first position of the wireless station based at least on the first signal path and the second wireless signal data.

16. The positioning method of claim 15, further comprising determining from the second wireless signal data a first duration of travel of the first wireless signal between the wireless communication device and the wireless station; and determining the first position of the wireless station further based at least on the first duration of travel.

17. The positioning method of claim 15, wherein determining the first position of the wireless station comprises determining a position of the wireless station along the first signal path.

18. The positioning method of claim 17, further comprising determining a linear distance between the wireless communication device and the determined position of the wireless station along the first signal path.

19. The positioning method of claim 15, further comprising controlling the one or more transceivers to transmit a third wireless signal along a second signal path.

20. The positioning method of claim 19, wherein the second signal path is a linear signal path.

21. The positioning method of claim 20, further comprising generating an assumption that an obstruction is between the wireless communication device and the wireless station if the wireless communication device receives a response from the wireless station to the first wireless signal but does not receive a response from the wireless station to the third wireless signal.

22. The positioning method of claim 20, further comprising generating an assumption that a line of sight is present between the wireless communication device and the wireless station if the wireless communication device receives a response from the wireless station to both the first wireless signal and the third wireless signal.

23. The positioning method of claim 19, further comprising:
receiving from the one or more transceivers fourth wireless signal data representing a response of the wireless station to the third wireless signal;
determining from the fourth wireless signal data a second duration of travel of the third wireless signal from the wireless communication device to the wireless station;
determining a position of the wireless station based on at least one of the first signal path and the first duration of travel and at least one of the second signal path and the second duration of travel.

24. The positioning method of claim 23, wherein the second signal path is characterized by a second signal path angle that changes relative to time.

25. The positioning method of claim 23, wherein the third wireless signal is a frequency diverse array signal.

26. One or more non-transient computer readable media, configured to cause one or more processors, when executed, to perform the method of:
transmitting from a wireless communication device a first wireless signal along a first signal path having a first signal path angle that changes relative to time;
receiving second wireless signal data representing a response of a wireless station to the first wireless signal; and
determining a first position of the wireless station based at least on the first signal path and the second wireless signal data.

* * * * *